March 19, 1963 W. M. DAY 3,081,693
COFFEE BASKET ASSEMBLY
Filed Sept. 6, 1960

INVENTOR.
WILLIAM M. DAY
BY
Lindsey, Prutzman and Hayes
ATTORNEYS 3,081,693
COFFEE BASKET ASSEMBLY
William M. Day, Farmington, Conn., assignor to Landers, Frary & Clark, New Britain, Conn., a corporation of Connecticut
Filed Sept. 6, 1960, Ser. No. 54,217
1 Claim. (Cl. 99—312)

The present invention relates generally to coffee makers, and more particularly, to an improved coffee basket assembly for use therein.

It is a general object of this invention to provide an improved coffee basket assembly that greatly simplifies the placing of a measured amount of coffee in the basket and which permits different amounts of coffee grounds to be measured into the basket with reference to but a single coffee grounds fill indicator on the basket.

It is a further object of the invention to provide a coffee measure and basket combination of the type described which is readily adjustable with a minimum of effort to vary the coffee grounds capacity, which is easily disassembled for cleaning, and which is economical to manufacture.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claim.

Figure 1:
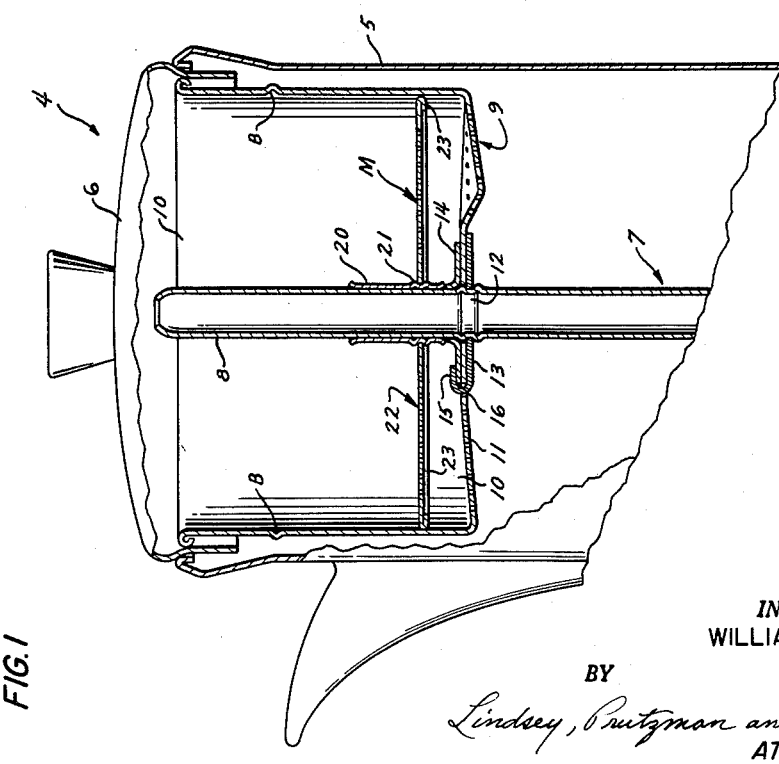
FIG. 1 is a fragmentary elevational view, partially in section and partly broken away, of a coffee percolator showing the internal structure of a coffee basket embodying the present invention.

Referring to FIG. 1, there is shown a percolator type coffee maker 4 which provides a brew or liquid receptacle 5 having an open top, normally closed by a conventional cover 6. The bottom of the percolator (not shown) supports the lower end of a fountain tube 7 which includes a pump (not shown) for circulating the water or brew upwardly through the fountain tube 7 to the open upper end 8 thereof where it is discharged.

Surrounding the upper end 8 of the fountain tube 7 is a coffee basket 9. The basket is generally cup shaped, having a cylindrical wall 10 and a floor 11, perforated as at 11'. The perforated floor 11 is apertured, preferably centrally thereof, to receive the upper end 8 of the fountain tube 7.

Figure 3:
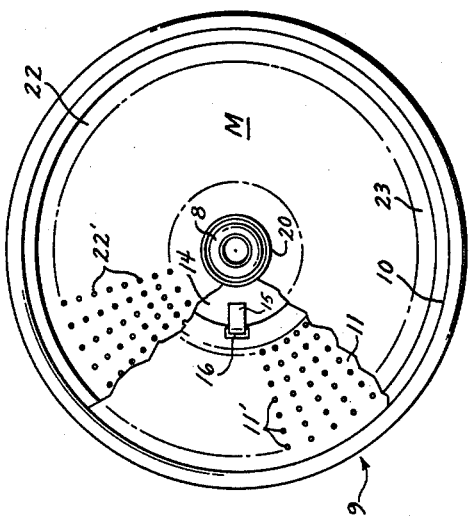
FIG. 3 is a top plan view partially broken away, of the basket, measuring platform and tube of FIG. 2.

The basket 9 is supported upon the tube 7 by means of an annular retainer disk 13, the inner circular edge of which is received within the groove of a single corrugation 12 formed intermediate the ends of the tube 7. The perforated floor 11 of the coffee basket 9 rests upon the upper surface of the disk 13 with the circular edge of the central aperture abutting the upper ridge of the groove 12. Overlying the perforated floor 11 is an annular washer 14 which is held in engagement with the perforated floor 11 by an inwardly turned lip 15 extending from the retainer disk 13 through a hole 16 in the perforated floor 11, as best seen in FIG. 3. The inner circular edge of the washer 14 is upturned to overlie the upper ridge of the single corrugation 12, thereby to prevent downward movement of the coffee basket 9 relative to the fountain tube 7.

In using the structure thus far described, a quantity of coffee grounds (not shown) is received within the basket 9 and is measured by the user with reference to a single fill indicator, in this case a pair of beads B formed in the basket wall 10 on either side thereof, and spaced vertically above the perforated floor 11 of the basket 9 a sufficient distance to represent a predetermined measure of coffee grounds, for instance sufficient for eight cups of coffee brew. Should the user desire to brew six to four cups of coffee, for instance, the coffee measure M of the invention is utilized in the manner to be described.

Figure 2:
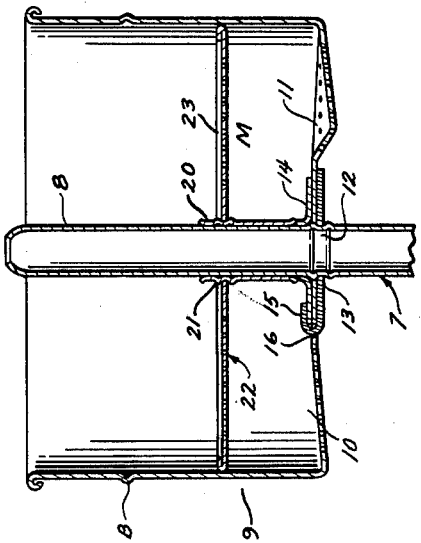
FIG. 2 is a sectional view of the basket assembly and fountain tube of FIG. 1, but with the measuring platform inverted relative to its position in FIG. 1.

In the preferred embodiment of the invention shown, the measure M is mounted adjacent the floor 11 of the basket 9 by means of an open ended cylindrical stand or sleeve 20 dimensioned to be slidably received over the upper end 8 of the fountain tube 7, as best seen in the sectional views of FIGS. 1 and 2. The ends of the sleeve 20 are flared outwardly to facilitate entry of the fountain tube 7 and engage the reduced end of the washer 14 to provide vertical support therefor. A single corrugation 21 is formed intermediate the ends of the sleeve 20 longitudinally offset relative to the longitudinal midpoint thereof. An annular platform 22, perforated as at 22', is secured at its inner circular edge within the groove of the corrugation 21. The outer circular edge of the platform 22 is bent inwardly as at 23 to provide a smooth edge to contact with the basket wall 10. The platform 22 and the basket wall 10 are dimensioned to be axially slidable relative to one another so that the platform 22 may be removed and inserted by sliding sleeve 20 over the fountain tube 7.

The corrugation 21 on the sleeve 20 is spaced relative to the ends of the sleeve 20 so that one end extends a greater distance on one side of the platform 22 than it does on the other. These distances are accurately determined so that when the flared end of the sleeve 20 extending the lesser of the two distances is resting on the washer 14 in the illustrated preferred embodiment, the distance between the platform 22 and bead B or coffee grounds fill indicator will represent a correct measure of coffee for making six cups of the coffee brew.

Similarly, the distance between the retaining corrugation 21 and the farther end of the sleeve 20 is accurately determined so that when the measure M is retracted from the basket, inverted and again inserted with this end resting on the washer 14, as in FIG. 2, the distance between the perforated platform 22 and the bead index B will represent a measure of coffee grounds for making four cups of the coffee brew.

The preferred embodiment of the invention, wherein the fountain tube 7, basket 9 and measure M form an assembly for percolator coffee makers, may be readily modified for use in coffee makers of the drip type by eliminating the tube and tube aperture in the basket floor 11 and providing a measure in which the distances between the platform and the ends of a two-way stand are spaced similarly to those of the platform 22 and the ends of the sleeve 20 shown. Similarly, the invention may be modified for measuring ten, eight and six measures of coffee grounds, or for measuring other varying amounts of the coffee grounds by varying the distances between the measure platform and sleeve or stand ends.

The invention, then, provides a coffee basket having an insertable and reversible measuring platform whereby varying measures of coffee grounds may be deposited within the coffee basket, and in each instance will be filled to a single fill index. Premeasuring coffee grounds is thereby eliminated as is the requirement of filling coffee grounds in the basket to one of several fill indices. The measuring platform of the invention is easily and economically fabricated and is readily removed for varying the position of the platform above the floor of the basket and for facile cleaning of the coffee grounds retaining elements. It is noted, too, that when the measure platform 22 of the invention is used, it provides a second or raised floor in the coffee basket so that a double filtering of the brew through the platform 22 and basket floor 11 results in a clear brew.

The structures shown and described herein are illustrative of the invention and when modified may readily fall within the spirit and scope of the invention as described by the following claim.

I claim:

In combination, a coffee basket, a percolator fountain tube, said basket having a side wall and a perforated floor apertured to receive the upper end of the fountain tube, said side wall providing a coffee ground level indicator spaced from the floor, means mounting the perforated floor of said basket on said tube, and a removable coffee grounds measure positioned within said basket, said measure comprising, a perforated, flat, coffee grounds supporting platform having an aperture therein, said platform having an outer edge engaging said basket wall, a sleeve secured to said platform adjacent the edge of said aperture, said sleeve being received on the upper end of said fountain tube within said basket and extending beyond both sides of said platform, the portion of said sleeve extending on one side of said platform being longer than the portion extending on the other side of said platform, the end of each of the sleeve portions being supported on said fountain tube to support said platform in parallel spaced relationship above said floor at a predetermined distance below said indicator, said platform and sleeve being invertible thereby to vary the capacity of said basket.

References Cited in the file of this patent
UNITED STATES PATENTS

| | | |
|---|---|---|
| 1,712,548 | Buske | May 14, 1929 |
| 1,866,777 | Sasser | July 12, 1932 |